Oct. 7, 1969    G. A. HUGHES ET AL    3,471,531
SYNTHESIS OF GONA-3,5-DIENES
Filed April 7, 1966

INVENTORS
GORDON ALAN HUGHES
HERCHEL SMITH

BY  V. V. Bellino
ATTORNEY

United States Patent Office 3,471,531
Patented Oct. 7, 1969

3,471,531
SYNTHESIS OF GONA-3,5-DIENES
Gordon Alan Hughes, Haverford, Pa., and Herchel Smith,
500 Chestnut Lane, Wayne, Pa. 19087; said Hughes
assignor to said Smith
Continuation-in-part of application Ser. No. 228,384,
Oct. 4, 1962. This application Apr. 7, 1966, Ser.
No. 540,984
Int. Cl. C07c *169/08, 173/10;* A61k *27/00*
U.S. Cl. 260—397.5                                3 Claims

ABSTRACT OF THE DISCLOSURE

The preparation of novel 13-polycarbon-alkylgona-3,5-dienes by esterifying or etherifying the corresponding gon-4-enes is described. These compounds have anabolic and androgenic activity and, in addition, are useful as intermediates for the preparation of compounds having progrestational, anabolic, and androgenic activities.

---

This application is a continuation-in-part of co-pending application Ser. No. 228,384, filed Oct. 4, 1962; which in turn is a continuation-in-part of application Ser. No. 195,000, filed May 15, 1962, now abandoned.

In describing the invention, reference will be made in the following specification to the annexed drawings, wherein.

The invention sought to be patented in a principal composition aspect is described as residing in the concept of a gona-3,5-diene nucleus having attached thereto in the 13-position a monovalent polycarbonalkyl radical.

The tangible embodiments of the composition aspect of the invention possess the inherent general physical properties of being white crystalline solids, are substantially insoluble in water and are generally soluble in polar solvents such as dimethylacetamide. Examination of compounds produced according to the hereinafter described process reveals, upon ultraviolet and infrared spectographic analysis, spectral data supporting the molecular structures herein set forth. The aforementioned physical characteristics, taken together with the nature of the starting materials and the mode of synthesis confirm the structure of the compositions sought to be patented.

The tangible embodiments of the invention possess the inherent use characteristics of exerting qualitatively varying hormonal effects in animals as evidenced by standard test procedures. Furthermore, said tangible embodiments possess the use characteristic of being intermediates for the preparation of compositions exerting hormonal effects as evidenced by standard test procedures.

The invention sought to be patented, in a principal process of making the composition aspect, is described as residing in the concept of a reaction comprising treating a compound with a gon-4-en-3-one nucleus having attached thereto in the 13-position a polycarbonalkyl radical (I) with an enol esterifying or etherifying, enamine-forming reagent to obtain a compound with a gona-3,5-diene nucleus having attached thereto in the 13-position a monovalent polycarbon-alkyl radical (II).

Figure 3:
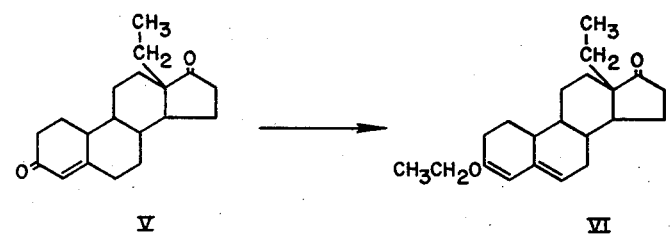
FIGURE 3 illustrates schematically the enol esterification of a 13-alkylgon-4-en-3-one to a 3-alkoxy-13-alkylgona-3,5-diene, specifically 13$\beta$-ethylgon-4-ene,-3,17-dione to 3-ethoxy-13$\beta$-ethylgona-3,5-dien-17-one.

The invention sought to be patented in a second process aspect, as illustrated in annexed FIGURE 3, is described as residing in the concept of a reaction comprising treating a compound with a gon-4-en-3-one nucleus having attached thereto in the 13-position a polycarbonalkyl radical (III) with an enol esterifying reagent to obtain a compound with a 3-alkoxygona-3,5-diene nucleus having attached thereto in the 13-position a monovalent polycarbon-alkyl radical (VI).

Figure 4:
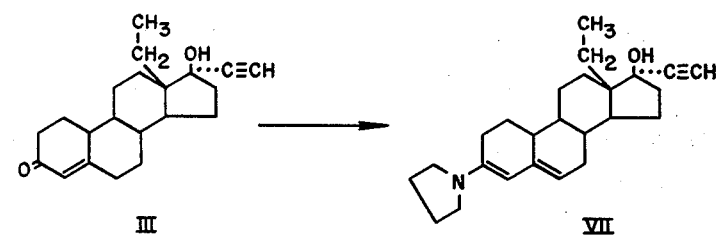
FIGURE 4 illustrates schematically the conversion of a 13-alkylgon-4-en-3-one to a 3-amino-13-alkylgona-3,5-diene specifically 17$\alpha$-ethynyl-13$\beta$-ethyl-17$\beta$-hydroxygon-4-en-3-one to 17$\alpha$-ethynyl-13$\beta$-ethyl-3-(1-pyrrolidinyl)gona-3,5-dien-17$\beta$-ol.

The invention sought to be patented in a third process aspect, as illustrated in annexed FIGURE 4, is described as residing in the concept of a reaction comprising treating a compound with a gon-4-en-3-one nucleus having attached thereto in the 13-position a polycarbon-alkyl radical (III) with a secondary amine to obtain the corresponding 3-aminogona-3,5-diene having attached thereto in the 13-position a monovalent polycarbon-alkyl radical (VII).

Figure 5:
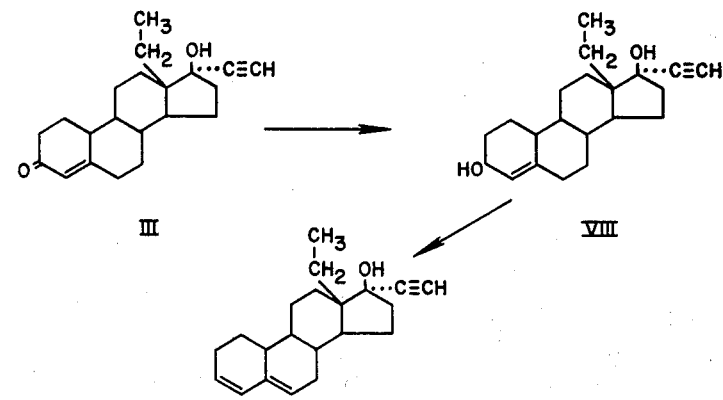
FIGURE 5 illustrates schematically the reaction sequence for preparing a 13$\beta$-alkylgona-3,5-diene from a 13$\beta$-alkylgon-4-en-3-one, specifically 17$\alpha$-ethynyl-13$\beta$-ethylgona-3,5-dien-17$\beta$-ol from 17$\alpha$-ethynyl-13$\beta$-ethyl-17$\beta$-hydroxygon-4-en-3-one.

The invention sought to be patented in a fourth process aspect, as illustrated in annexed FIGURE 5, is described as residing in the concept of reducing a compound with a gon-4-en-3-one nucleus having attached thereto in the 13-position a monovalent polycarbon-alkyl radical (III) with a complex metal hydride to obtain the corresponding gon-4-en-3-ol (VIII) and thereafter eliminating the 3-hydroxyl group to obtain a gona-3,5-diene having attached thereto in the 13-position a monovalent polycarbon-alkyl radical.

The manner of making the chemical compounds, which are the starting materials for use in making the compounds of the invention, and for use in the processes of making the invention, are illustrated in co-pending U.S. application Ser. No. 228,384, filed Oct. 4, 1962, and Ser. No. 388,820, filed Aug. 11, 1964.

Figure 1:
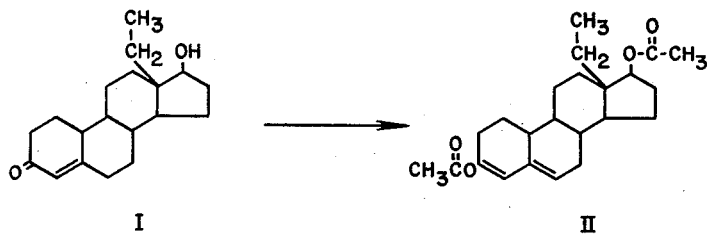
FIGURE 1 illustrates schematically the enol esterification of a 13-alkylgon-4-en-3-one to a 3-acyloxy-13-alkylgona-3,5-diene, specifically 13$\beta$-ethyl-17$\beta$-hydroxygon-4-en-3-one to 3,17$\beta$-diacetoxy-13$\beta$-ethylgona-3,5-diene.

The manner and process of making and using the invention will now be generally described so as to enable a person skilled in the art of chemistry to make and use same, as follows:

Referring now to FIGURE 1, wherein the compounds are assigned Roman numerals for identification schematically 3,17$\beta$-diacetoxy-13$\beta$-ethylgona-3,5-diene (II) is formed by heating 13$\beta$-ethyl-17$\beta$-hydroxygon-4-en-3-one with a mixture of acetic anhydride and acetyl chloride in pyridine.

Figure 2:
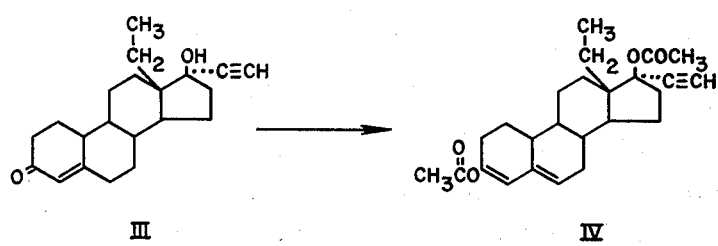
FIGURE 2 illustrates schematically the enol acylation of a 17-alkynyl-13-alkylgon-4-en-3-one to a 3-acyloxy-17-alkynyl-13-alkylgona-3,5-diene, specifically 17$\alpha$-ethynyl-13$\beta$-ethyl-17$\beta$-hydroxygon-4-en-3-one to 3,17$\beta$-diacetoxy-17$\alpha$-ethynyl-13$\beta$-ethylgona-3,5-diene.

Another specific embodiment of this invention, referring to FIGURE 2, compound III, 17$\alpha$-ethynyl-13$\beta$-ethyl-17$\beta$-hydroxygon-4-en-3-one is heated with acetyl chloride and acetic anhydride in pyridine to convert it to 3,17$\beta$-diacetoxy-17$\alpha$-ethynyl-13$\beta$-ethylgona-3,5-diene.

Referring to FIGURE 3, a third specific embodiment of the invention, 3-ethoxy-13$\beta$-ethylgona-3,5-dien-17-one (VI) is formed by treating 13$\beta$-ethylgon-4-ene-3,17-dione (V) with ethyl orthoformate in the presence of p-toluene sulfonic acid.

Referring to FIGURE 4, a fourth specific embodiment, 17$\alpha$-ethynyl-13$\beta$-ethyl-3-(1 - pyrrolidinyl)gona - 3,5-dien-17$\beta$-ol (VII) is formed by heating 17$\alpha$-ethynyl-13$\beta$-ethyl-17$\beta$-hydroxygon-4-en-3-one (III) with pyrrolidine in benzene in the presence of an acid catalyst such as p-toluene sulfonic acid.

Referring to FIGURE 5, 17α-ethynyl-13β-ethylgona-3,5-dien-17β-ol (IX) is formed by acid treatment of 17α-ethynyl-13β-ethylgon-4-en-3,17β-diol (VIII), obtained by reduction of 17α-ethynyl-13β-ethyl-17β-hydroxygon-4-en-3-one (III) with a complex metal hydride such as sodium borohydride.

The 6-carbon atom of the starting gonenones (I, III, V) can be substituted, as for example, with an alkyl group, such as methyl or ethyl. The 7-carbon atom of the starting gonenones (I, III, V) can be similarly substituted.

For the process of the invention, and except for the limitations expressed in this specification, variations of the B-ring on the structures of the invention, or on intermediates leading thereto, are full equivalents of each other.

The 1, 2 and 4-carbon atoms of the starting gonenones (I, III, V) can also be substituted, as, for example, with an alkyl group such as methyl or ethyl.

For the processes of the invention, and except for the limitations expressed in this specification, variations of the A-ring on the structures of the invention, or on the intermediates leading thereto, are full equivalents of each other.

The 13-position of the starting gonenones (I, III, V) can be substituted with any polycarbonalkyl radical such as ethyl, n-propyl, isopropyl, butyl, isobutyl and hexadecyl. Further, starting gonenes may be prepared, by methods given in the patent applications disclosed above, wherein the 13-position is substituted with any organic radical. Thus, but without limiting the generality of the foregoing, an aralkyl, cycloalkylalkyl, or a polyalkylene bridge bearing a hydroxy, amino, or alkylamino substituent can readily be placed at the 13-position, and from such compounds other variations of the 13-position substituent can be prepared, as haloalkyl from hydroxyalkyls, or quaternary salts, amides, alkenyls, etc., from aminoalklys.

For the processes of the invetnion and except for the limitations expressed in this specification, structures of the invention having variations at the 13-position or the tetracyclic intermediates leading thereto are the full equivalents of the claimed 13-position polycarbonalkyl substituted gonanes, having physiological activity of the same type.

In any of the intermediate structures or in the structures of the invention wherein the 17-position is carbonyl, the carbonyl group can be converted to a group such as hydroxymethylene by lithium aluminum hydride reduction; to acyloxymethylene by esterification of the hydroxymethylene group so formed; to alkoxymethylene by etherification of the hydroxymethylene group; to alkylhydroxymethylene by addition of the appropriate organo-metallic reagent to the carbonyl; or to alkynylhydroxymethylene by addition of the appropriate alkali metal acetylide in a suitable inert solvent; all in the known manner. The carbonyl group may be ketalised or thioketalised by treating with appropriate alcohol or glycol in a suitable solvent under acedic conditions, as in the presence of an acid such as sulfuric acid, p-toluene sulfonic acid, or borontrifluoride etherate, with heating where necessary, according to the known art. In some of these transformations at $C_{17}$, the 3-substituted gona-3,5-diene system will be simultaneously modified.

The specific reactions involved in the processes of the invention will now be considered, as follows, reference being made to the drawings for typifying compounds.

The enol esters (II, IV) of the invention are prepared by treating the corresponding 17-hydroxy or 17-acyloxy-gon-4-en-3-ones with an acyl halide or anhydride in the presence of an acidic or basic catalyst, for example p-toluene sulfonic acid and pyridine. When the starting compound is a 17-hydroxygon-4-en-3-one, the 3-acyloxygona-3,5-diene can be prepared without acylation at $C_{17}$ by first forming the enolate of the starting gon-4-en-3-one using one equivalent of a suitable base such as potassium tert-butoxide and then adding one equivalent of the acyl halide or acyl anhydride. The gon-4-en-3-one system can also be reacted with an inorganic acid to form a gona-3,5-diene with an inorganic substituent at $C_3$ as, for example, with hydrobromic acid to form a 3-bromogona-3,5-diene.

The 3-alkoxygona-3,5-dienes (VI) are prepared by treating the corresponding gon-4-en-3-ones (V) with an alkyl orthoformate in the presence of an acid catalyst such as sulfuric acid and pyridine hydrochloride. The 3-enamines (VII) are similarly prepared from the gon-4-en-3-ones by reaction with a secondary amine in the presence of an acid catalyst and, where necessary, continuous removal of water formed during the reaction.

The gona-3,5-dienes (IX) having no substituent at the 3-position are prepared by elimination of gon-4-en-3-ols, generally under acidic conditions, which in turn are prepared by reduction of gon-4-en-3-ones with a complex metal hydride such as sodium borohydride and lithium aluminum hydride. The gon-4-en-3-ols can be acylated and the ester so formed eliminated to the gona-3,5-diene when the direct method is not satisfactory.

The gona-3,5-dienes having a group attached by oxygen to the 3-position of the gonene nucleus can be converted back to a gon-4-en-3-one by treatment with acid such as hydrochloric acid and, in the case of 3-acyloxygona-3,5-dienes, also with base, for example aqueous sodium bicarbonate. Thus, these 3-substituted gona-3,5-dienes are useful as protecting groups for the gon-4-en-3-one system during modification of other parts of the molecule, particularly the 17-position.

While the tetracyclic compounds in this specification and the appended examples are named to describe the configuration corresponding to that of the natural steroids, it is to be understood that unless otherwise indicated, the product of each of the given manipulative procedures is a racemic mixture which contains said named compound and its enantiomorph. When resolved starting materials are used, by applying the manipulative procedures described herein, the corresponding enantiomorph is obtained.

The following examples illustrate the manner of using the claimed processes of the invention for the preparation of the claimed compositions of the invention.

EXAMPLE 1

13β-ethyl-3-ethoxygona-3,5-dien-17-one

Stir 13β-ethylgon-4-en-3,17-dione (5.0 g.) in dioxan (250 cc.) with ethyl orthoformate (10 cc.) and p-toluene sulfonic acid (0.3 g.) for 3 hours. Add pyridine (10 cc.) followed by water (400 cc.) and extract the mixture with ether. Wash, dry and evaporate the ethereal solution to obtain the title compound (4.12 g.); infrared absorption peak at 5.78μ; ultraviolet absorption maximum at 242 mμ (ε 12,150).

EXAMPLE 2

13β-ethyl-3-ethoxy-6-methylgona-3,5,-dien-17-one

Stir 13β-ethyl-6-methylgon-4-ene-3,17-dione (0.5 g.) in dioxan (15 cc.) with ethyl orthoformate (1.0 cc.) and p-toluenesulfonic acid (0.03 g.) for 3 hours. Add pyridine (0.5 cc.) followed by water (30 cc.). Filter the precipitate, wash and dry to obtain the title compound (0.38 g.). M.P. 140–141°; infrared absorption peaks at 5.75, 6.08, 6.18μ; ultraviolet absorption maximum at 248 mμ (ε 18,400).

EXAMPLE 3

13β-ethyl-3-ethoxy-17α-ethynyl-6-methylgona-3,5-dien 17β-ol

Stir 13β-ethyl - 3 - ethoxy-6-methylgona-3,5-dien-17-one (0.38 g.) in dimethylacetamide (20 cc.) with lithium acetylide-ethylenediamine complex (0.95 g.) in an atmosphere of acetylene for 4½ hours. Pour the solution onto ice, extract with ether and wash, dry and evaporate the ethereal solution to give the title compound as a gum (0.35 g.); infrared absorption peaks at 6.08, 6.18μ.

EXAMPLE 4

13β-ethyl-7α-methyl-3-pyrrolidinylgona-3,5-dien-17-one

Add 13β - ethyl-17β-hydroxy-7α-methylgon-4-en-3-one (0.6 g.) in pyridine (6.0 cc.) to an ice cold suspension of chromium trioxide (0.6 g.) in pyridine (6.0 cc.) and allow the mixture to stand at 25° for 18 hours. Pour into water and extract with benzene-ether (1:1; 3× 100 cc.). Filter the solution and wash with water, dry and evaporate. Recrystallize the residue from acetone to obtain 13β-ethyl-7α-methylgon-4-ene-3,17-dione (0.525 g.), M.P. 163–164°. Dissolve this dione (0.5 g.) in boiling methanol (10 cc.), add pyrrolidine (0.15 cc.), reflux for 1 minute and then cool in an ice bath. Filter and dry the precipitate to obtain the title compound (0.45 g.), M.P. 147–154°; infrared absorption peaks at 5.78, 6.13, 6.24μ.

EXAMPLE 5

13β,17α-diethyl-3,17β-diacetoxygona-3,5-diene

Reflux 13β,17α-diethyl-17-hydroxygon-4-en-3-one (3.0 g.) with acetic anhydride (48 cc.), acetyl chloride (24 cc.) and pyridine (2.4 cc.) for 2 hours. Evaporate the mixture to dryness under reduced pressure and partition the residue between benzene-ether and water. Wash, dry and evaporate the organic layer and triturate the residue with ether. Filter, wash the residue with hexane and dry to obtain the title compound, M.P. 122–125°; infrared absorption peaks at 5.71, 5.78, 6.0μ; ultraviolet absorption maximum 238 mμ (ε 18,200).

Calculated for $C_{25}H_{36}O_4$: C, 74.96%; H, 9.06%. Found: C, 74.64%; H, 9.10%.

EXAMPLE 6

13β-ethyl-17α-ethynyl-3,17-diacetoxygona-3,5-diene

Reflux 13β-ethyl-17α-ethynyl-17β-hydroxygon-4-en-3-one (1.0 g.) with acetic anhydride (16 cc.), acetyl chloride (8 cc.) and pyridine (0.8 cc.) for 1½ hours. Evaporate to dryness under reduced pressure and partition the residue between benzene-ether and water. Wash, dry and evaporate the organic solution and triturate the residue with ice-cold ether to obtain the title compound (0.725 g.), M.P. 144–150°; infrared absorption peaks at 3.09, 5.67, 5.77μ; ultraviolet absorption maximum at 236 mμ (ε 19,300).

Calculated for $C_{25}H_{32}O_4$: C, 75.72%; H, 8.11%. Found: C, 75.28%; H, 7.86%

EXAMPLE 7

13β-ethyl-17α-chloroethynyl-3,17-diacetoxygona-3,5-diene

Reflux 13β-ethyl-17α-chloroethynyl - 17α - hydroxygon-4-en-3-one (3.0 g.) with acetic anhydride (48 cc.), acetyl chloride (24 cc.) and pyridine (2.4 cc.) for 2 hours. Evaporate to dryness under reduced pressure and partition the residue between benzene-ether and water. Wash, dry and evaporate the organic solution and triturate the residue with cold ether and then wash with hexane to obtain the title compound (3.0 g.) M.P. 177–180°; infrared absorption peaks at 4.50, 4.70, 5.75, 6.0μ; ultraviolet absorption maximum at 236 mμ (ε 18,800).

Calculated for $C_{25}H_{31}O_4Cl$: C, 69.67%; H, 7.25%. Found: C, 69.93%; H, 7.26%.

EXAMPLE 8

17α-chloroethynyl-3,17β-diheptanoyloxy-13β-ethylgona-3,5-diene

Heat 17α - chloroethynyl - 17β - hydroxy - 13β - ethyl-gon-4-en-3-one (3.0 g.), with n-heptanoic anhydride (50 cc.), n-heptanoyl chloride (25 cc.) and pyridine (2.4 cc.) at 100° for 3½ hours. Filter the cooled solution and distill the filtrate at 0.5 mm./Hg to obtain the title compound (3.7 g.). Recrystallize from methanol to obtain the product as a waxy solid, M.P. 56–65°; infrared absorption peaks at 3.99, 6.5, 5.75μ.

EXAMPLE 9

3-acetoxy-13β-ethylgona-3,5-dien-17-one

Add 13β-ethylgon-5(10)-en-3,17-dione (5.5 g.) in benzene (20 cc.) to a solution of potassium (0.75 g.) in tert-butanol (100 cc.) in an atmosphere of nitrogen. Distill the mixture, replacing the distillate with benzene until all the tert-butanol has been replaced with benzene. Cool, and add acetic anhydride (5.0 cc.) slowly with stirring. After 30 minutes, pour the mixture into water and extract with ether. Warm, dry and evaporate the organic solution and recrystallize the residue from ether-hexane to give the title compound as a crude solid (4.5 g.); infrared absorption peaks at 5.7, 5.77, 6.0, 6.13μ; ultraviolet absorption maximum at 240 mμ (ε 15,000)

EXAMPLE 10

17α-ethynyl-13β-ethylgona-3,5-dien-17β-ol

Treat 17α - ethynyl - 13β - ethyl - 17α - hydroxygon-4-en-one (1.0 g.) in ethanol (100 cc.) with sodium borohydride (1.0 g.). After 2 hours, evaporate most of the ethanol, add ether and benzene and wash, dry and evaporate the organic solution. Heat the residue with acetic acid (15 cc.) at 100° for 30 minutes. Dilute the cooled solution with water and extract the mixture with ether. Wash, dry and evaporate the ethereal solution and recrystallize the residue from hexane to obtain the title compound (0.4 g.), M.P. 120–122°.

Calculated for $C_{21}H_{28}O$: C, 85.05%; H, 9.52%. Found: C, 84.76%; H, 9.51%.

EXAMPLE 11

13β-ethyl-3-ethoxygona-3,5-dien-17β-ol

Treat 13β - ethyl - 17β - hydroxygon - 4 - en-3-one (1.0 g.) in dioxan (10 cc.), ethanol (0.01 cc.) and ethyl orthoformate (1.0 cc.) with 72% perchloric acid and stir for 1 minute. Pour the mixture into pyridine (0.2 cc.), add ether and wash, dry and evaporate the organic solution. Crystallize the residue from aqueous methanol and filter and dry the gummy crystals to obtain the crude title compound; infrared absorption peaks at 3.0, 3.45, 3.50, 5.76, 6.06, 6.15μ.

EXAMPLE 12

13′β-ethyl-4,5-dihydro-3′-acetoxyspiro[furan-2(3H)-17′-gona-3′,5′-diene]

Dissolve 13β - ethyl - 17 - hydroxy - 3 - methoxygona-1,3,5(10)-trien-17α-propionic acid, γ-lactone (40 g.) in ether (500 cc.), add lithium aluminum hydride (15 g.) and reflux for 2 hours. Add water to decompose excess reagent, filter 13β-ethyl-17α-3-hydroxypropyl)-3-methoxygona-1,3,5(10)-trien-17β-ol (32.4 g.), M.P. 172–175°.

Dissolve 13β - ethyl - 17α - (3 - hydroxypropyl) - 3-methoxygona - 1,3,5(10) - trien - 17β-ol (30.4 g.) in pyridine (85 cc.) and add p-toluenesulfonyl chloride. Stir for 16 hours, add water and filter the precipitate. Recrystallize from methanol-ether to obtain 13β′-ethyl-4,5-dihydro-3′-methoxyspiro[furan - 2(3H) - 17′ - gona - 1′,3′, 5′(10)-triene] (21.2 g.), M.P. 111–113°.

Dissolve 13β′ - ethyl - 4,5 - dihydro - 3′ - methoxyspiro [furan - 2(3H) - 17′ - gona - 1′,3′,5′,(10′) - triene] (2.5 g.) in tetrahydrofuran (200 cc.) and liquid ammonia (360 cc.) and add lithium (2.0 g.) in portions to the stirred solution. After 4½ hours, add ethanol (10 cc.) dropwise over 30 minutes and when the blue color is discharged, evaporate most of the ammonia and add water. Filter the precipitate and recrystallize from methanol to obtain 13β′ - ethyl - 4,5 - dihydro - 3′-methoxyspiro [furan - 2 - (3H),17′ -gona - 2′,5′(10′)diene] (2.05 g.), M.P. 142–146°. Stir this product (2.0 g.) with hydrochloric acid (2.4 cc.) and water (1.6 cc.) in methanol (36 cc.) at 20° for 2 hours. Add water, filter and recrystallize from ether to obtain 13'β-ethyl-4,5-dihydro-3'-oxospiro[furan - 2(3H) - 17' - gon-4'ene] (1.75 g.), M.P. 145–148°.

Reflux 13'β - ethyl - 4,5 - dihydro - 3' - oxospiro[furan-2(3H)-17'-gon-4'-ene] (5.0 g.) with acetic anhydride (75 cc.), pyridine (4.0 cc.) and acetyl chloride (40 cc.) for 1½ hours. Evaporate to dryness under reduced pressure and partition the residue between benzene-ether and water. Wash, dry and evaporate the organic layer and triturate the residue twice with ice-cold ether to obtain the title compound (2.725 g.) M.P. 120–123°; infrared absorption peaks at 5.67, 8.25μ; ultraviolet absorption maximum at 327 mμ (ε 17,560).

Calculated for $C_{24}H_{34}O_3$: C, 77.80%; H, 9.25%. Found: C, 78.01%; H, 8.98%.

EXAMPLE 13

13β-ethyl-17-hydroxy-3-acetoxygona-3,5-diene-17α-propionic acid γ-lactone

Reflux 13β - ethyl - 17β - hydroxy - 3 - oxogon-4-en-17α-propionic acid, γ-lactone (5.0 g.) with acetic anhydride (90 cc.), acetyl chloride (35 cc.) and pyridine (3.52 cc.) for 2 hours and then remove the solvents under reduced pressure. Triturate the residue with cold methanol and filter to obtain the title compound (5.5 g.), M.P. 194–200°; infrared absorption peaks at 5.64, 5.70, 6.0, 6.13μ; ultraviolet absorption maximum 238 mμ (ε 14,340).

Calculated for $C_{24}H_{32}O_4$: C, 74.97%; H, 8.42%. Found: C, 74.48%; H, 8.42%.

EXAMPLE 14

13β-ethyl-3,17β-diacetoxy-gona-3,5-diene

Reflux 13β-ethyl - 17β - hydroxy-gon-4-en-3-one with pyridine (1.6 cc.) and acetyl chloride (16 cc.) in acetic anhydride (40 cc.) for 2½ hours under nitrogen. Evaporate the solvents under reduced pressure and recrystallize the residue thrice from chloroform-methanol to obtain the title compound, M.P. 151–157°.

Calculated for $C_{23}H_{32}O_4$: C, 74.2%; H, 8.7%. Found: C, 74.2%; H, 8.4%.

Ultraviolet absorption peak at 236 mμ (ε 18,800); infrared absorption peaks at 5.75, 5.99, 6.10μ.

This compound has anabolic and androgenic activity and is useful as an intermediate for preparing the hormonal compounds of this invention.

EXAMPLE 15

13β-ethyl-3-(1-pyrrolidinyl)-gona-3,5-dien-17β-ol

Reflux 13β-ethyl-17β-hydroxy-gon-4-en-3-one (1.9 g.) in benzene (25 cc.) and pyrrolidine (9 g.) for 4 hours under a Dean-Starke trap. Evaporate the solvent under reduced pressure to give as residue the title compound; ultraviolet absorption peak at 280 mμ.

This compound has anabolic and androgenic activity and is useful as an intermediate for preparing the hormonal compounds of this invention.

EXAMPLE 16

13β,17α-diethyl-3-acetoxy-gona-3,5-dien-17β-ol

Dissolve potassium (0.3 g.) in tertiary butanol (40 cc.) in an atmosphere of nitrogen and add to the refluxing solution 13β,17α-diethyl-17β-hydroxy-gon-4-en-3-one (1 g.) in benzene (30 cc.). Distill off the azeotrope, add more benzene to maintain a constant volume until the temperature of the distilling vapour reaches 80° and then maintain there for 45 minutes. Cool the mixture in ice, and add acetic anhydride (1 cc.), and reflux for 15 minutes. Add saturated aqueous sodium bicarbonate to the cooled reaction mixture, remove the organic layer, wash with water and dry ($Na_2SO_4$). Evaporate the solvent and recrystallize the residue from methanol to obtain the title compound (0.45 g.), M.P. 105–111°; ultraviolet absorption max. 235 mμ (ε 17,850); infrared spectum 3.1, 5.75, 6.0, 6.1μ.

This compound has anabolic and androgenic activity and is useful as an intermediate for preparing the hormonal compounds of this invention.

EXAMPLE 17

13β-ethyl-3-ethoxy-17α-ethnyl-gona-3,5-dien-17β-ol

Treat 13β-ethyl - 17α - ethynyl-17β-hydroxy-gon-4-en-3-one (2.5 g.) with ethyl orthoformate (5 cc.) and toluene-p-sulphonic acid (0.15 g.) in dioxan at room temperature for 3 hours. Add pyridine and water, extract the mixture with ether and wash, dry and evaporate the ethereal solution and recrystallize the residue from ether-hexane to obtain the title compound (1.4 g.); M.P. 113–123°; ultraviolet absorption max. 242 mμ (ε 15,860); infrared absorption (KBr disc.) 2.93, 3.08, 5.75, 6.06, 6.17μ.

This compound has progestational activity and is useful as an intermediate for preparing the hormonal compounds of this invention.

We claim:

1. A chemical compound of the structure

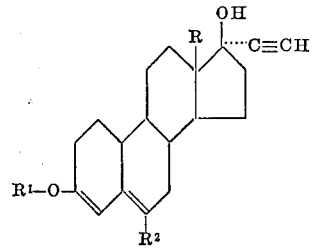

wherein R is a polycarbon-alkyl radical containing from two to about sixteen carbon atoms, $R^1$ is lower alkyl, and $R^2$ is hydrogen or methyl.

2. The compound of claim 1, 13β-ethyl-3-ethoxy-17α-ethynyl-gona-3,5-dien-17β-ol.

3. The compound of claim 1, 13β-ethyl-3-ethoxy-17α-ethynyl-6-methylgona-3,5-dien-17β-ol.

References Cited

UNITED STATES PATENTS

| 3,019,241 | 1/1962 | Ercoli | 260—397.4 |
| 3,053,735 | 9/1962 | Ercoli | 167—55 |
| 3,072,646 | 1/1963 | Fried et al. | 260—239.55 |
| 3,194,803 | 7/1965 | Colton | 260—239.57 |

HENRY A. FRENCH, Primary Examiner

U.S. Cl. X.R.

260—239.5, 239.55, 239.57, 397.4, 999